United States Patent
Lee et al.

(10) Patent No.: US 9,335,835 B2
(45) Date of Patent: May 10, 2016

(54) METHOD AND APPARATUS FOR PROVIDING USER INTERFACE

(71) Applicant: Samsung Electronics Co., Ltd, Gyeonggi-do (KR)

(72) Inventors: Yu-Jin Lee, Seoul (KR); Han-Jun Ku, Gyeonggi-do (KR); Han-Kyung Jeon, Gyeonggi-do (KR); Seung-Hwan Cho, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 99 days.

(21) Appl. No.: 14/011,632

(22) Filed: Aug. 27, 2013

(65) Prior Publication Data

US 2014/0055399 A1 Feb. 27, 2014

(30) Foreign Application Priority Data

Aug. 27, 2012 (KR) ........................ 10-2012-0093979

(51) Int. Cl.
*G06F 3/03* (2006.01)
*G06F 3/01* (2006.01)
*G06F 3/0488* (2013.01)
*G10L 13/00* (2006.01)
*G10L 15/26* (2006.01)
*G06F 3/02* (2006.01)

(52) U.S. Cl.
CPC *G06F 3/03* (2013.01); *G06F 3/017* (2013.01); *G06F 3/0227* (2013.01); *G06F 3/04883* (2013.01); *G10L 13/00* (2013.01); *G10L 15/26* (2013.01); *G06F 2203/04108* (2013.01); *G06F 2203/04807* (2013.01)

(58) Field of Classification Search
CPC ............ G06F 2203/04108; G06F 2203/04807; G06F 3/04883; G06F 3/03545; G06F 3/0488; G06F 2203/0381; G10L 15/26; G10L 15/00; G10L 13/00; G10L 13/08; G10L 15/22
USPC .................. 345/156–179; 704/246, 251, 260
See application file for complete search history.

(56) References Cited

U.S. PATENT DOCUMENTS

| | | |
|---|---|---|
| 2003/0107607 A1 | 6/2003 | Nguyen |
| 2003/0214531 A1 | 11/2003 | Chambers et al. |
| 2003/0227492 A1 | 12/2003 | Wilde et al. |
| 2005/0099407 A1 | 5/2005 | Pennington, II et al. |
| 2006/0290656 A1* | 12/2006 | Soong et al. .................. 345/156 |
| 2009/0018838 A1* | 1/2009 | Ahn et al. ..................... 704/260 |
| 2010/0222098 A1* | 9/2010 | Garg .......................... 455/556.1 |
| 2010/0251112 A1 | 9/2010 | Hinckley et al. |
| 2011/0157028 A1* | 6/2011 | Stallings et al. .............. 345/173 |
| 2012/0302167 A1* | 11/2012 | Yun et al. ..................... 455/41.2 |

FOREIGN PATENT DOCUMENTS

| | | |
|---|---|---|
| EP | 1 538 549 A1 | 6/2005 |
| KR | 100715593 B1 | 4/2007 |
| KR | 1020100089620 A | 8/2010 |

OTHER PUBLICATIONS

European Search Report dated Dec. 4, 2013 in connection with European Patent Application No. EP 13 18 1880.

* cited by examiner

*Primary Examiner* — Hong Zhou

(57) ABSTRACT

A method of providing a user interface of a portable terminal includes receiving a mode switching request into a handwriting input mode from a user during executing an application, switching into the handwriting input mode according to the mode switching request, recognizing handwritten data received from the user, converting the recognized handwritten data to data with a preset format, processing the converted data through a preset scheme and displaying a result of the processing on a touch screen.

17 Claims, 13 Drawing Sheets

METHOD AND APPARATUS FOR PROVIDING USER INTERFACE

CROSS-REFERENCE TO RELATED APPLICATION(S) AND CLAIM OF PRIORITY

The present application is related to and claims the priority under 35 U.S.C. §119(a) to Korean Application Serial No. 10-2012-0093979, which was filed in the Korean Intellectual Property Office on Aug. 27, 2012, the entire content of which is hereby incorporated by reference.

TECHNICAL FIELD

The present disclosure relates generally to a method of providing a user interface, and more particularly, to a method of providing a user interface which supports a handwriting input.

BACKGROUND

In general, a user input unit included in a portable terminal such as a mobile communication terminal is implemented by a keypad. A user input through the keypad may be performed through an input scheme in which a user directly presses a button mounted to the terminal by using his/her hand or an input scheme in which the user uses a touch screen. Among the input schemes, the input scheme using the touch screen includes a soft keyboard input scheme and a handwriting recognition scheme. The soft keyboard input scheme displays an input window in a keyboard form on a touch screen and receives an input through a pen click or a finger click in order to overcome a disadvantage of the portable terminal in which a general keyboard and a mouse are not easily portable. Further, the handwriting input scheme recognizes a person's handwriting and converts the handwriting to a data code.

The conventional handwriting input scheme should pass through five steps of placing a cursor in a position to which handwriting is to be input, executing a handwriting input application, performing switching to a handwriting input screen, inputting handwritten data, and identifying a recognition result of the handwritten data and pressing a storage button by the user. Accordingly, it is inconvenient to input the handwriting and an unwanted input is frequently generated without a clear intention to make the input.

SUMMARY

To address the above-discussed deficiencies of the prior art, one object of the present disclosure is to provide a method of preventing generation of an input which a user does not want by allowing input mode switching by using a hovering operation.

Another aspect of the present disclosure is to simplify a handwriting input process by recognizing handwriting written by the user, converting the handwriting to a text, and automatically inserting the converted text into an input unit of an application executed on a screen.

In accordance with one aspect of the present disclosure, a method of providing a user interface in a portable terminal is provided. The method includes receiving a mode switching request into a handwriting input from a user during executing an application, switching into the handwriting input mode according to the mode switching request, recognizing handwritten data received from the user, converting the recognized handwritten data to data with a preset format, processing the converted data through a preset scheme, and displaying a result of the processing on a touch screen.

In accordance with another aspect of the present disclosure, a non-transitory machine-readable storage medium recording a program for executing a method of providing a user interface of a device and a device with the storage medium.

In accordance with another aspect of the present disclosure, a portable terminal for providing a user interface is provided. The portable terminal includes a storage unit configured to store an application, a touch screen configured to display input data and detect contact or hovering of a touch means, and a controller configured to receive a mode switching request into a handwriting input from a user during executing the application, switch into the handwriting input mode according to the mode switching request of a user, recognize handwritten data received from the user, convert the recognized handwritten data to data with a preset format, processes the converted data through a preset scheme, and display a result of the processing on the touch screen.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two-of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The present disclosure may have various modifications and embodiments and thus will be described with reference to specific embodiments in detail. However, the present disclosure is not limited to the specific embodiments but should be construed as including all modifications, equivalents, and substitutes within the spirit and scope of the present disclosure.

While terms including ordinal numbers, such as "first" and "second," etc., may be used to describe various components, such components are not limited by the above terms. The above terms are used only to distinguish one component from another. For example, a first component may be referred to as a second component without departing from the scope of the present disclosure, and likewise a second component may be referred to as a first component. The term of and/or encompasses a combination of plural items or any one of the plural items.

The terms used herein are merely used to describe specific embodiments, and are not intended to limit the present disclosure. An expression used in the singular encompasses the expression of the plural, unless it has a clearly different meaning in the context. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

Figure 1:
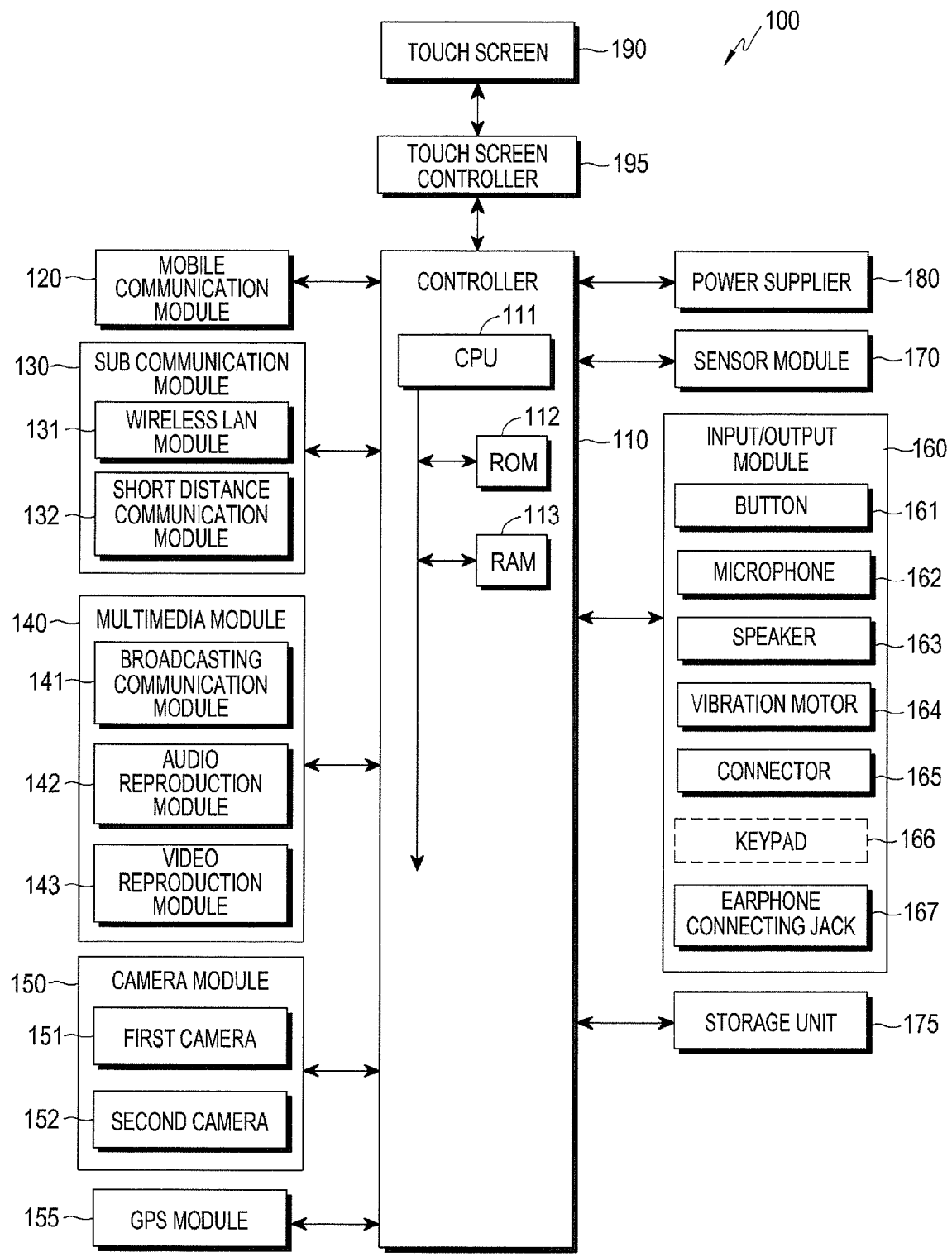
FIG. 1 is a block diagram schematically illustrating a portable terminal according to an embodiment of the present disclosure.
Figure 2:
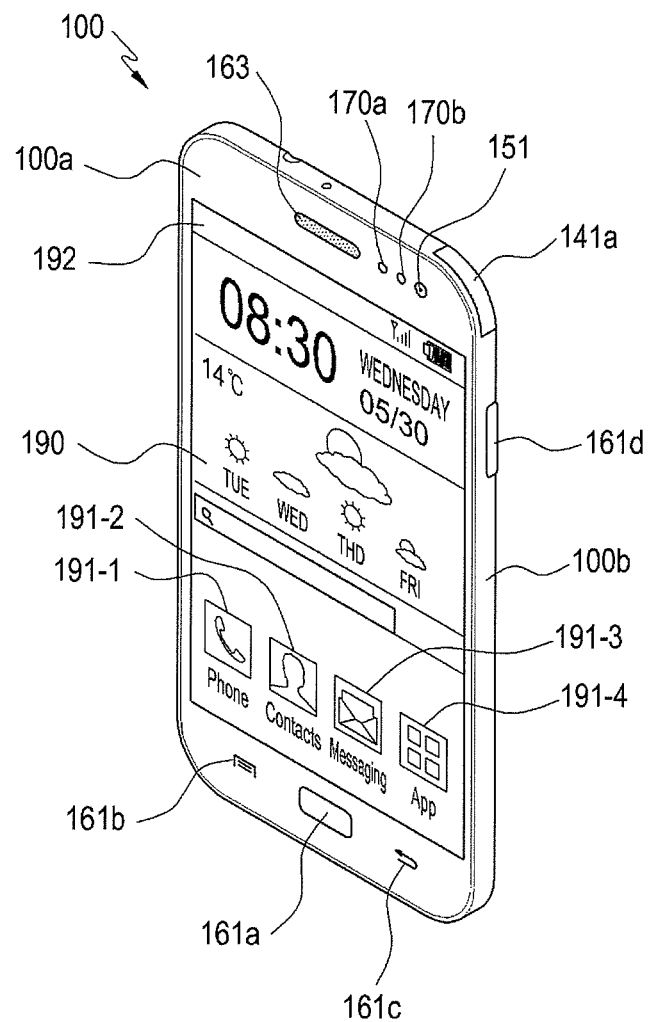
FIG. 2 is a front perspective view of a portable terminal according to an embodiment of the present disclosure.
Figure 3:
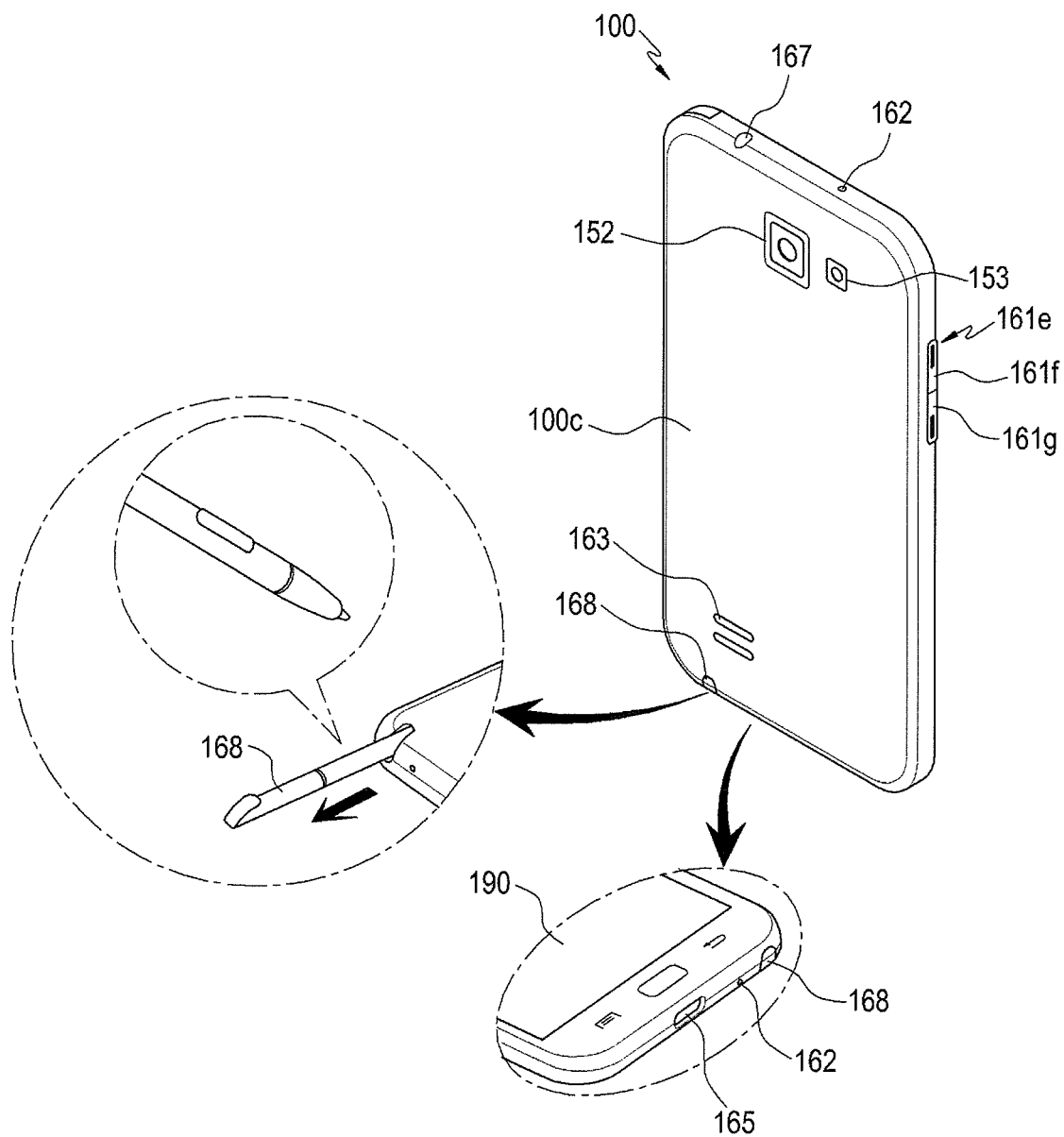
FIG. 3 is a rear perspective view of a portable terminal according to one embodiment of the present disclosure.

FIG. 1 is a block diagram schematically illustrating a portable terminal according to an embodiment of the present disclosure, FIG. 2 is a front perspective view of a portable terminal according to an embodiment of the present disclosure, and FIG. 3 is a rear perspective view of a portable terminal according to an embodiment of the present disclosure.

Referring to FIG. 1, a portable terminal 100 can be connected with an external device (not shown) by using an external device connector such as a sub communication module 130, a connector 165, and an earphone connecting jack 167. The external device includes various devices attached to or detached from the portable terminal 100 through a cable, such as an earphone, an external speaker, a Universal Serial Bus (USB) memory, a charger, a cradle/dock, a DMB antenna, a mobile payment related device, a health management device (blood sugar tester or the like), a game machine, a car navigation device and the like. Further, the external device includes a Bluetooth communication device, a short distance communication device such as a Near Field Communication (NFC) device, a WiFi Direct communication device, and a wireless Access Point (AC) which can be wirelessly connected. In addition, the external device can include another device, a mobile phone, a smart phone, a tablet PC, a desktop PC, and a server.

The portable terminal 100 can be a smart phone, a mobile phone, a game machine, a TV, a display device, a head unit for a vehicle, a notebook, a laptop, a tablet PC, a Personal Media Player (PMP), a Personal Digital Assistant (PDA) or the like. The portable terminal 100 can be implemented as a portable mobile terminal having a wireless communication function in a pocket size.

Referring to FIG. 1, the portable terminal 100 includes a touch screen 190 and a touch screen controller 195. Further, the portable terminal 100 includes a controller 110, a mobile communication module 120, a sub communication module 130, a multimedia module 140, a camera module 150, a GPS module 155, an input/output module 160, a sensor module 170, a storage unit 175, and a power supplier 180. The sub communication module 130 includes at least one of a wireless LAN module 131 and a short distance communication module 132, and the multimedia module 140 includes at least one of a broadcasting communication module 141, an audio reproduction module 142, and a video reproduction module 143. The camera module 150 includes at least one of a first camera 151 and a second camera 152. The input/output module 160 includes at least one of a button 161, a microphone 162, a speaker 163, a vibration motor 164, a connector 165, a keypad 166, and an earphone connecting jack 167.

The controller 110 includes a CPU 111, a ROM 112 storing a control program for controlling the portable terminal 100, and a RAM 113 used as a storage area for storing a signal or data input from the outside of the apparatus 100 or for work performed in the portable terminal 100. The CPU 111 includes a single core, a dual core, a triple core, or a quad core. The CPU 111, the ROM 112, and the RAM 113 can be mutually connected to each other through an internal bus.

The controller 110 can control the mobile communication module 120, the sub communication module 130, the multimedia module 140, the camera module 150, the GPS module 155, the input/output module 160, the sensor module 170, the storage unit 175, the power supplier 180, the touch screen 190, and the touch screen controller 195.

The mobile communication module 120, the sub communication module 130, and the broadcasting communication module 141 of the multimedia module 140 can be collectively called a communication unit, and the communication unit is provided for a direct connection with an external device or a connection through a network and can be a wired or wireless communication unit. The communication unit can transmit data to the controller 110, the storage unit 175, and the camera module 150 through a cable, or wirelessly or receive data from an external communication line or the air and then transmit the data to the controller 110 or store the data in the storage unit 175.

The mobile communication module 120 enables the portable terminal 100 to be connected with the external device through mobile communication by using, one antenna or a plurality of antennas according to a control of the controller 110. The mobile communication module 120 transmits/receives a wireless signal for exchanging, unidirectional transmitting, or receiving data of voice phone communication, video phone communication, a Short Message Service (SMS), or a Multimedia Message Service (MMS) to/from a mobile phone (not shown), a smart phone (not shown), a tablet PC, or another device (not shown) having a phone number input into the apparatus 100.

The sub communication module 130 can include at least one of the wireless LAN module 131 and the short distance communication module 132. For example, the sub communication module 130 can include only the wireless LAN module 131, only the near field communication module 132, or both the wireless LAN module 131 and the near field communication module 132.

The wireless LAN module 131 can be Internet-connected according to a control of the controller 110 in a place where a wireless Access Point (AP) (not shown) is installed. The wireless LAN module 131 supports a wireless LAN standard (IEEE802.11x) of the Institute of Electrical and Electronics Engineers. The short distance communication module 132 can wirelessly perform near field communication between the portable terminal 100 and an image forming apparatus (not shown) according to a control of the controller 110. A short distance communication scheme can include Bluetooth, Infrared Data Association (IrDA) communication, WiFi-Direct communication, Near Field Communication (NFC) and the like.

The portable terminal 100 can include at least one of the mobile communication module 120, the wireless LAN module 131, and the short distance communication module 132. For example, the portable terminal 100 can include a combination of the mobile communication module 120, the wireless LAN module 131, and the short distance communication module 132 according to a capability thereof.

The multimedia module 140 includes the broadcasting communication module 141, the audio reproduction module 142, or the video reproduction module 143. The broadcasting communication module 141 can receive a broadcasting signal (for example, a TV broadcasting signal, a radio broadcasting signal, or a data broadcasting signal) and broadcasting supplement information (for example, Electric Program Guide: EPG or Electric Service Guide: ESG) output from a broadcasting station through a broadcasting communication antenna (not shown) according to a control of the controller 110. The audio reproduction module 142 can reproduce a digital audio file (for example, a file having a file extension of mp3, wma, ogg, or way) stored or received according to a control of the controller 110. The video reproduction module 143 can reproduce a digital video file (for example, a file having a file extension of mpeg, mpg, mp4, avi, mov, or mkv) stored or received according to a control of the controller 110. The video reproduction module 143 can reproduce the digital audio file.

The multimedia module 140 includes the audio reproduction module 142 or the video reproduction module 143 except for the broadcasting communication module 141. Further, the audio reproduction module 142 or the video reproduction module 143 of the multimedia module 140 can be included in the controller 110.

The camera module 150 includes at least one of the first camera 151 and the second camera 152 for photographing a still image or a video according to a control of the controller 110. Further, the first camera 151 or the second camera 152 includes an auxiliary light source (for example, a flash (not shown) providing light required for the photographing. The first camera 151 can be disposed on a front surface of the apparatus 100, and the second camera 152 can be disposed on a back surface of the apparatus 100. Alternatively, the first camera 151 and the second camera 152 are closely located to each other (for example, a distance between the first camera 151 and the second camera 152 is larger then 1 cm and smaller than 8 cm) and photograph a three dimensional still image or a three dimensional video.

The cameras 151 and 152 can include a lens system, an image sensor, a flash and the like. The cameras 151 and 152 converts an optical signal input (or photographed) through the lens system to an image signal and outputs the converted image signal to the controller 110. Then, the user can photograph a video or a still image through the cameras 151 and 152.

The lens system forms an image of a subject by converging a light incident from the outside. The lens system includes at least one lens and each lens can be a convex lens, an aspheric lens, or the like. The lens system has symmetry with respect to an optical axis passing through the center thereof, and the optical axis is defined as a center axis. The image sensor detects the optical image formed by the external light incident through the lens system as an electrical image signal. The image sensor has a plurality of pixel units placed in an M×N matrix structure and includes a photodiode and a plurality of transistors. The pixel unit accumulates charges generated by the incident light, and a voltage by the accumulated charges indicates illuminance of the incident light. In processing one image included in a still image or a video, the image signal output from the image sensor consists of a set of the voltages (i.e., pixel values) output from the pixel units and the image signal indicates one frame (i.e., a still image). Further, the frame consists of M×N pixels. The image sensor includes a Charge-Coupled Device (CCD) image sensor, a Complementary Mental-Oxide Semiconductor (CMOS) image sensor and the like.

A driver drives the image sensor according to a control of the controller 110. The driver drives entire pixels of the image sensor or only pixels in an area of interest among the entire pixels according to a control signal received from the controller 110, and image data output from the pixels is output to the controller 110.

The controller 110 processes the image input from the cameras 151 and 152 or the image stored in the storage unit 175 in the unit of frames and outputs an image frame converted to be suitable for screen characteristics (size, picture quality, resolution and the like) of the touch screen 190 to the touch screen 190.

The GPS module 155 can receive radio waves from a plurality of GPS satellites (not shown) in Earth's orbit and calculate a position of the portable terminal 100 by using Time of Arrival from the GPS satellites to the portable terminal 100.

The input/output module 160 includes at least one of the button 161, the microphone 162, the speaker 163, the vibration motor 164, the connector 165, and the keypad 166. The input/output module 160 except for the connector 165 is used as a means for receiving a user input or informing the user of information. Other examples of the input/output module 160 are not limited thereto, but a mouse, a trackball, a joystick, or a cursor control such as cursor direction keys can be provided for information communication with the controller 110 and a control of a motion of the cursor on the touch screen 190.

The button 161 can be formed on a front surface 100a, a side surface 100b, or a back surface 100c of the portable terminal 100, and can include at least one of a power button 161d, a volume button 161e having a volume increase button 161f and a volume decrease button 161g, a menu button 161h, a home button 161a, a back button 161c, and a search button.

The microphone 162 receives a voice or a sound to generate an electrical signal according to a control of the controller 110.

The speaker 163 can output sounds corresponding to various signals (for example, a wireless signal, a broadcasting signal, a digital audio file, a digital video file, taking a picture or the like) of the mobile communication module 120, the sub communication module 130, the multimedia module 140, or the camera module 150 to the outside of the portable terminal 100 according to a control of the controller 110. The speaker 163 can output a sound (for example, button tone corresponding to phone communication, ringing tone, and a voice of another user) corresponding to a function performed by the portable terminal 100. One speaker 163 or a plurality of speakers 163 can be formed on a suitable position or positions of the housing of the portable terminal 100.

The vibration motor 164 can convert an electrical signal to a mechanical vibration according to a control of the controller 110. For example, when the a portable terminal 100 in a vibration mode receives voice or video phone communication from another device (not shown), a vibration motor is operated. One vibration motor 164 or a plurality of vibration motors 164 can be formed within the housing of the portable terminal 100. The vibration motor can operate in accordance with a touch action of the user on the touch screen or successive motions of the touch on the touch screen 190.

The connector 165 can be used as an interface for connecting the apparatus with an external device (not shown) or a power source (not shown). The portable terminal 100 can transmit or receive data stored in the storage unit 175 of the apparatus 100 to or from an external device (not shown) through a wired cable connected to the connector 165 according to a control of the controller 110. The external device can be a docking station, and the data can be an input signal transmitted from an external input device, for example, a mouse, a keyboard or the like. The portable terminal 100 can receive power from the power source through the wired cable connected to the connector 165 or charge a battery (not shown) by using the power source.

The keypad 166 can receive a key input from the user for the control of the portable terminal 100. The keypad 166 includes a physical keypad (not shown) formed in the portable terminal 100 or a virtual keypad (not shown) displayed on the display unit 190. The physical keypad (not shown) formed in the portable terminal 100 can be excluded according to a capability or structure of the portable terminal 100.

An earphone (not shown) is inserted into the earphone connecting jack 167 to be connected with portable terminal 100.

The sensor module 170 includes at least one sensor for detecting a state (position, direction, motion or the like) of the portable terminal 100. For example, the sensor module 170 includes at least one of a proximity sensor for detecting whether the user approaches the portable terminal 100, an illumination sensor (not shown) for detecting an amount of ambient light of the portable terminal 100, a motion/direction sensor for detecting motions of the portable terminal 100 (for example, rotation, acceleration, retardation, vibration of the portable terminal 100), and an altimeter for measuring an atmospheric pressure to detect an altitude. Further, the motion/direction sensor can include an acceleration sensor, a geo-magnetic sensor (not shown) for detecting a point of the compass by using the Earth's magnetic field, a gravity sensor for detecting a gravity action direction, a gyro sensor, an impact sensor, a GPS, a compass sensor and the like. At least one sensor detects a state, generates a signal corresponding to the detection, and transmits the signal to the controller 110. The sensors of the sensor module 170 can be added or omitted according to the capability of the portable terminal 100.

The storage unit 175 can store a signal or data input/output according to the operation of the communication module 120, the sub communication module 130, the multimedia module 140, the camera module 150, the GPS module 155, the input/output module 160, the sensor module 170, or the touch screen 190. The storage unit 175 can store a control program and applications for controlling the portable terminal 100 or the controller 110.

The term "storage unit" is used as a term which refers to a random data storage device such as the storage unit 175, the ROM 112 and the RAM 113 within the controller 110, or a memory card (for example, an SD card or a memory stick) installed in the portable terminal 100.

The storage unit 175 can store images for providing applications having various functions such as a navigation, a video phone call, a game and the like and Graphical User Interfaces (GUIs) related to the applications, databases related to a method of providing user information, a document, and the user interface, data, background images (menu screen, standby screen and the like) required for driving the portable terminal 100, operating programs, or images photographed by the camera. The storage unit 175 is a machine (for example, computer)-readable medium, and the term of the machine-readable medium can be defined as a medium for providing data to the machine to perform a specific function. The machine-readable medium can be a storage medium. The storage unit 175 can include a non-volatile medium and a volatile medium. All such media should be a type in which commands transmitted by the media can be detected by a physical mechanism reading the commands through a machine.

The machine-readable medium is not limited thereto and includes at least one of a floppy disk, a flexible disk, a hard disk, a magnetic tape, a Compact Disk Read-Only Memory (CD-ROM), an optical disk, a punch card, a paper tape, a Read-Only Memory (RAM), a Programmable ROM (PROM), an Erasable PROM (EPROM), and a flash-EPROM.

The power supplier 180 can supply power to one battery or a plurality of batteries (not shown) arranged at the portable terminal 100 according to a control of the controller 110. The one battery or the plurality of batteries (not shown) supply power to the portable terminal 100. Further, the power supplier 180 can supply power input from an external power source (not shown) to the portable terminal 100 through a wired cable connected to the connector 165. In addition, the power supplier 180 can supply power wirelessly input from the external power source to the portable terminal 100 through a wireless charging technology.

The touch screen 190 can provide user interfaces corresponding to various services (for example, phone communication, data transmission, broadcasting, and photography) to the user. The touch screen 190 can transmit an analog signal corresponding to at least one touch input into the user interface to the touch screen controller 195. The touch screen 190 can receive at least one touch through a touch means (for example, a finger, a stylus pen or the like). Further, the touch screen 190 can receive successive motions of one touch among the at least one touch. The touch screen 190 can transmit an analog signal corresponding to the successive motions of the input touch to the touch screen controller 195.

Further, a stylus pen 168 can be foil led in a lower side surface of the portable terminal 100. The stylus pen 168 can be stored while being inserted into the portable terminal and can be withdrawn and removable from the portable terminal 100 when being used. In addition, a pen removable switch (not shown) operating in accordance with attachment and detachment of the stylus pen 168 is located in one area with in the portable terminal into which the stylus pen 168 is inserted and provides a signal corresponding to the attachment and detachment of the stylus pen 168 to the controller 110.

Furthermore, the touch according to the present disclosure is not limited to a touch between the touch screen 190 and a touch means (a finger or a stylus pen) and can include a non-contact (for example, a case where a distance between the touch screen 190 and the touch means is within a detection threshold distance of 1 cm or shorter). The detection threshold distance from the touch screen 190 can be changed according to a capability or structure of the portable terminal 100. Particularly, the touch screen 190 is implemented to change an output value thereof according to a distance between the touch screen 190 and the touch means such that a touch event by the touch between the touch screen 190 and the touch means and an input (for example, hovering) event in a non-contact state are distinguishably detected. That is, the touch screen 190 is implemented to differently output a value (for example, a current value, a voltage value, a capacitance value or the like) detected by the touch event and a value detected by the hovering event.

Meanwhile, the touch screen controller 195 converts an analog signal received from the touch screen 190 to a digital signal (for example, (X,Y) coordinates and detection value) and transmits the converted digital signal to the controller 110. The controller 110 can control the touch screen 190 by using the digital signal received from the touch screen controller 195. For example, the controller 110 allows a short-cut icon displayed on the touch screen 190 to be executed in response to the touch event or the hovering event. Further, the touch screen controller 195 can be included in the controller 110 or the touch screen 190.

Further, the touch screen controller 195 can calculate a distance between the touch means and the touch screen 190 based on a value output from the touch screen 190, and convert the calculated distance value to a digital signal (for example, a Z coordinate) and then provide the converted digital signal to the controller 110.

In addition, in order to distinguishably detect an input by a finger and an input by a stylus pen, the touch screen 190 can include at least two touch screen panels which can detect the input by the finger and the input by the stylus pen, respectively. The at least two touch screen panels provide different output values to the touch screen controller 195, and the touch screen controller 195 differently recognizes the values input from the at least two touch screen panels to determine whether the input from the touch screen 190 is the input by the finger or the stylus pen. For example, the touch screen 190 can have a structure in which a touch screen panel in a capacitive type and a touch screen panel in an Electromagnetic Resonance (EMR) type are combined.

Referring to FIG. 2, the touch screen 190 is disposed on a center of the front surface 100a of the portable terminal 100. The touch screen 190 has a large size to occupy most of the front surface 100a of the portable terminal 100. FIG. 2 shows an example where a main home screen is displayed on the touch screen 190. The main home screen is a first screen displayed on the touch screen 190 when power of the portable terminal 100 is turned on. Further, when the portable terminal 100 has different home screens of several pages, the main home screen can be a first home screen of the home screens of several pages. Short-cut icons 191-1, 191-2, and 191-3 for executing frequently used applications, a main menu icon 191-4, time, weather and the like can be displayed on the home screen. The main menu icon 191-4 displays a menu screen on the touch screen 190. Further, a status bar 192 which displays the status of the portable terminal 100 such as a battery charging status, a received signal intensity, and a current time can be formed on an upper end of the touch screen 190.

A home button 161a, a menu button 161b, and a back button 161c can be formed below the touch screen 190.

The home button 161a displays the main home screen on the touch screen 190. For example, when the home button 161a is pressed in a state where a home screen different from the main home screen, the menu screen, or an application screen is displayed on the touch screen 190, the main home screen is displayed on the touch screen 190. That is, when the home button 161a is touched while applications are executed on the touch screen 190, the main home screen shown in FIG. 2 can be displayed on the touch screen 190. In addition, the home button 161a can be used to display recently used applications or a task manager on the touch screen 190.

The menu button 161b provides a connection menu which can be used on the touch screen 190. The connection menu includes a widget addition menu, a background changing menu, a search menu, an editing menu, an environment setup menu and the like.

The back button 161c can be used for displaying the screen which was executed just before the currently executed screen or terminating the most recently used application.

The first camera 151, the illumination sensor 170a, and the proximity sensor 170b can be disposed on edges of the front surface 100a of the portable terminal 100. The second camera 152, the flash 153, and the speaker 163 can be disposed on a rear surface 100c of the portable terminal 100.

For example, the power button 161d, the volume button 161e, a terrestrial DMB antenna 141a for broadcasting reception, and one or a plurality of microphones 162 can be disposed on a side surface 100b of the portable terminal 100. The DMB antenna 141a can be fixed to the portable terminal 100 or can be formed to be detachable from the portable terminal 100.

Further, the connector 165 is formed on a lower side surface of the portable terminal 100. A plurality of electrodes are formed in the connector 165, and the connector 165 can be connected to the external device through a wire. The earphone jack 167 can be formed on a side surface of an upper end of the portable terminal 100. Earphones can be inserted into the earphone jack 167.

In addition, the controller 110 included in the portable terminal 100 according to an embodiment of the present disclosure is implemented to perform a user interface providing method according to an embodiment of the present disclosure.

Figure 4:
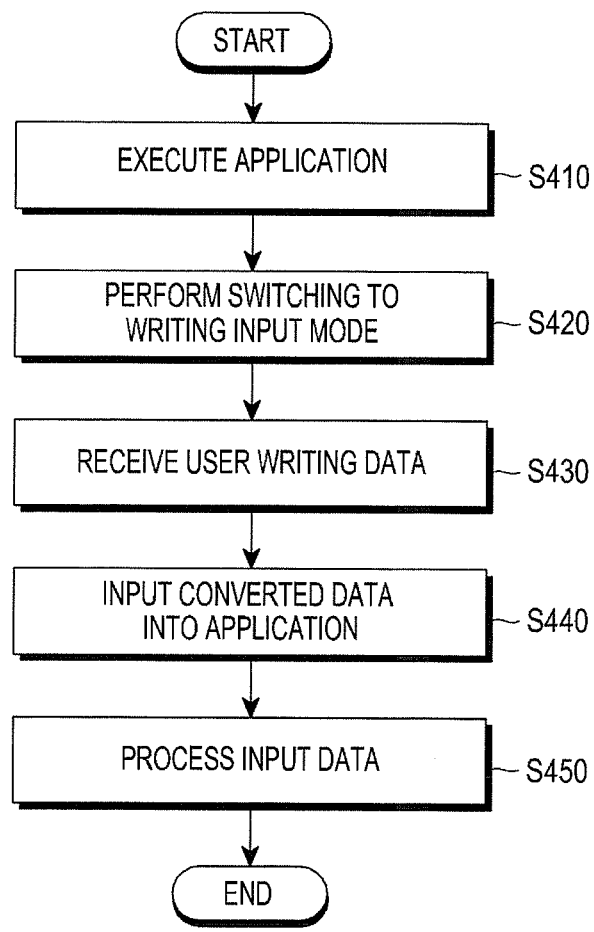
FIG. 4 is a flowchart for describing a user interface providing method according to one embodiment of the present disclosure.

FIG. 4 is a flowchart for describing a user interface providing method according to an embodiment of the present disclosure.

The method includes steps S410 to S450.

In step S410, the device executes an application, and the user executes a desired application by selecting a button, an icon, or a menu item or inputting a voice command, a gesture, a motion, or a touch pattern through the touch screen 190, the input/output module 160, or the camera module 150. The application can be a random application which receives a user input, for example, a voice recognition application, a schedule management application, a document writing application, a music application, an Internet application, a map application, a camera application, an e-mail application, an image editing application, a search application, a file search application, a video application, a game application, an SNS application, a phone application, a message application or the like.

In step S420, the device performs a switching into a handwriting input mode. When the user makes a request for switching a mode in a state where an application is executed, the controller 110 switches an application execution mode to a handwriting input mode according to the mode switching request and then operates.

The mode switching request can be generated in a case where the user performs a hovering operation on a surface of the touch screen 190 by using a touch means for a preset time or according to a preset pattern, the user selects a handwriting input button or a handwriting input menu item provided by an application or an operating system, or the user inputs a preset touch pattern. A hovering pattern or a touch pattern refers to a trace of a preset pattern, such as a circle, triangle, rectangular or the like drawn by the touch means.

The handwriting input mode can be displayed through a tool bar including an indicator such as an icon or a text or a button for each function, or a separate handwriting input screen or window, and accordingly the user can view the handwriting input mode. The handwriting input mode can be executed in a form of directly displaying an application screen without displaying a separate handwriting input screen or a form of displaying the separate handwriting input screen.

Figure 5:
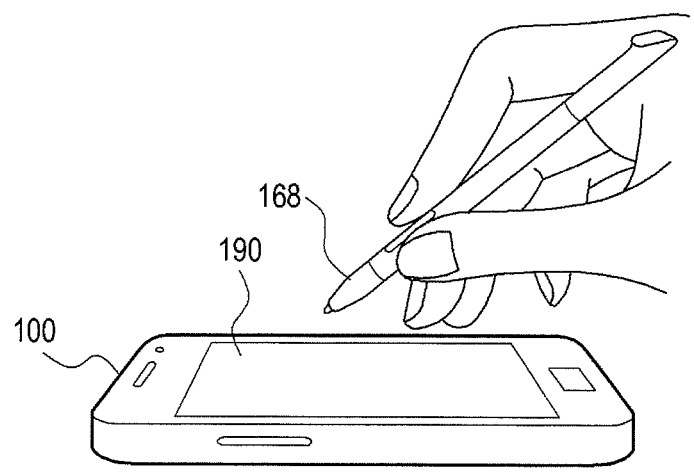
FIG. 5 illustrates a hovering, operation.

FIG. 5 is a diagram for describing a hovering operation.

As illustrated in FIG. 5, the user performs a hovering operation while maintaining a position of the stylus pen 168 within a detection threshold distance from the surface of the touch screen 190 of the portable terminal 100.

In step S430, the device receives user handwritten data. In the handwriting input mode, the user inputs handwritten data having desired contents to the touch screen 190 by using the touch means. At this time, the handwritten data is displayed while overlapping (that is, being overlaid with) the application window. The handwritten data can have a type (for example, character string) which can be recognized by the controller 110 and then converted to digital text data, that is, an image-text convertible type, or a image-text non-convertible type (for example, drawing).

Meanwhile, the controller 110 identifies whether data converted from the executed application can be processed. When the input data cannot be processed or the processing is not required, the controller 110 can store the converted data without inputting the converted data to the application. Further, the controller 110 can capture and store a screen into which the handwritten data is input.

In step S440, the device inputs the converted data into the application. The controller 110 converts handwritten data input by the user to data having a preset format and inputs the converted data into the executed application. The controller 110 recognizes the handwritten data input by the user. When the handwritten data has an image-text convertible type, the controller 110 converts the handwritten data to text data having a preset format. When the handwritten data has an image-text non-convertible type, the controller 110 converts the handwritten data to image data having a preset format. The image data can be bitmap data, stroke data indicated by coordinate strings or the like.

In step S450, the device processes input data. The executed application performs an operation of a program according to the input data. The input data can be post-processed by being displayed on an input window of the application screen and then selecting a separate button or menu item by the user.

For example, the voice recognition application can transmit the input data to an external server and provide a response result received from the external server to the user. The schedule management application, the document writing application, the e-mail application, or the message application can insert the input data into a document (e.g., file, message, e-mail or the like). The music application, the Internet application, the camera application, the image editing application, the search application, the file search application, the video application, or the phone application can perform an operation indicated by the input data and provide a result of the operation to the user.

Figure 6:
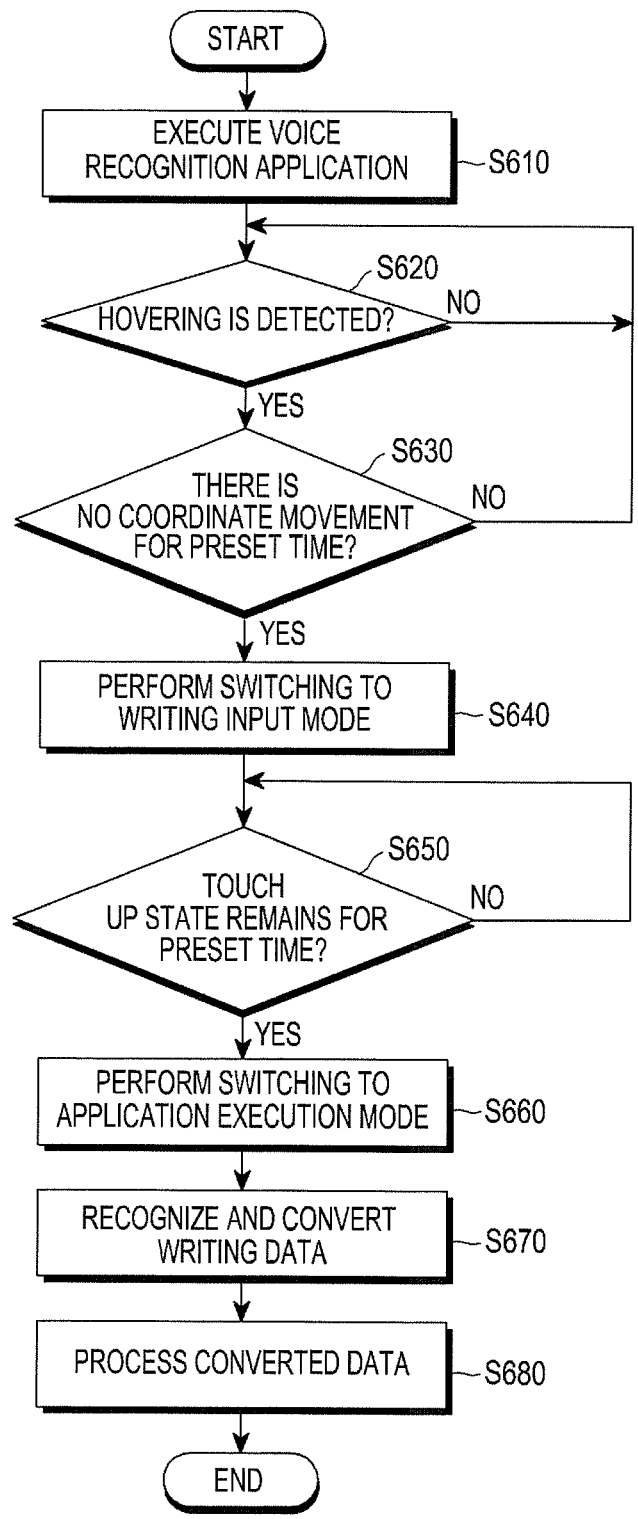
FIG. 6 is a flowchart for describing a user interface providing method in a voice recognition application according to an embodiment of the present disclosure.

FIG. 6 is a flowchart for describing a user interface providing method in a voice recognition application according to one embodiment of the present disclosure.

The method includes steps S610 to S680. In step S610, the device executes a voice recognition application. The user executes the voice recognition application by selecting a button, an icon, or a menu item, or by conducting a voice command, a gesture, a motion, or a touch pattern through the touch screen 190, the input/output module 160, or the camera module 150.

For example, the user can execute the voice recognition application by double clicking the home button 161a. Hereinafter, although the voice recognition application is described as a subject of a program operation, the program operation can be performed by the controller 110.

Figure 7:
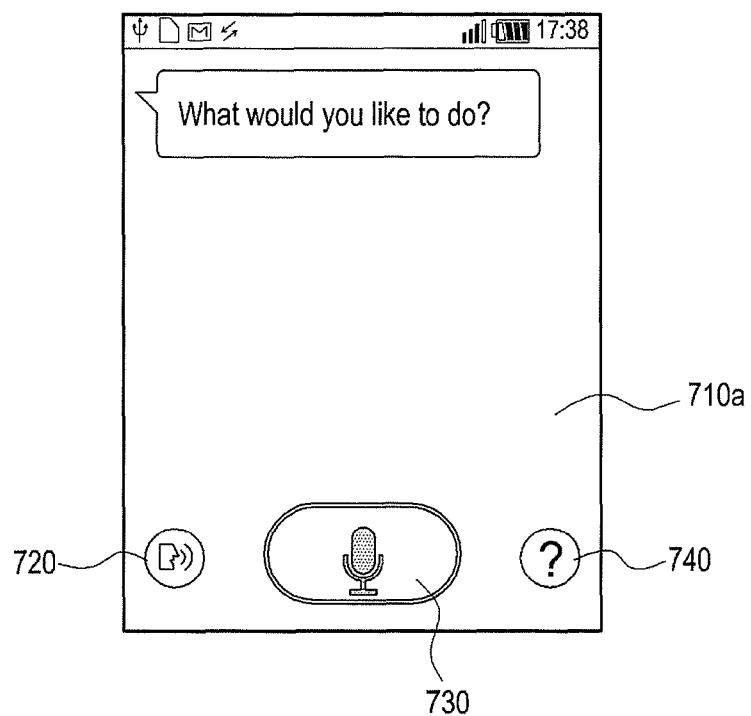
FIG. 7 illustrates an initial screen of a voice recognition application.

FIG. 7 is a diagram illustrating an initial screen of the voice recognition application.

When the voice recognition application is initially driven, a usage guideline expression such as "What operation do you want to execute?" or "What would you like to do?" is displayed on an application window 710a.

A voice guide button 720 for guiding a usage method with a voice when being clicked, a voice recognition button 730 for executing a voice recognition mode when being clicked, and a help button 740 for expressing examples of the usage method when being clicked are provided to a lower part of the application window 710a.

In step S620, the device detects a hovering operation. The controller 110 determines whether the user performs the hovering operation on the surface of the touch screen 190 by using the stylus pen 168. That is, the user performs the hovering operation by maintaining a position of the stylus pen 168 within a detection threshold distance from the surface of the touch screen 190, and the controller 110 detects a hovering event based on a detection value of the touch screen 190. When the hovering event is detected, the controller 110 proceeds to step S630. When the hovering event is not detected, the controller 110 repeats step S620.

In step S630, the device identifies whether a mode switching condition is satisfied, that is, identifying a mode switching request. The controller 110 determines whether the hovering event remains for a preset time without any coordinate movement. The coordinate movement can be determined according to whether the coordinate escapes from an area of a preset size based on an initial coordinate when an initial hovering event is generated. Unlike the present embodiment, the controller 110 can determine only whether the hovering event remains for a preset time regardless of the coordinate movement. When the mode switching condition is satisfied, the controller 110 proceeds to step S640. When the mode switching condition is not satisfied, the controller 110 returns to step S620. The mode switching condition can further include clicking the handwriting input button.

The remaining of the hovering event for the preset time without any coordinate movement corresponds to one example of a preset hovering pattern.

Figure 8:
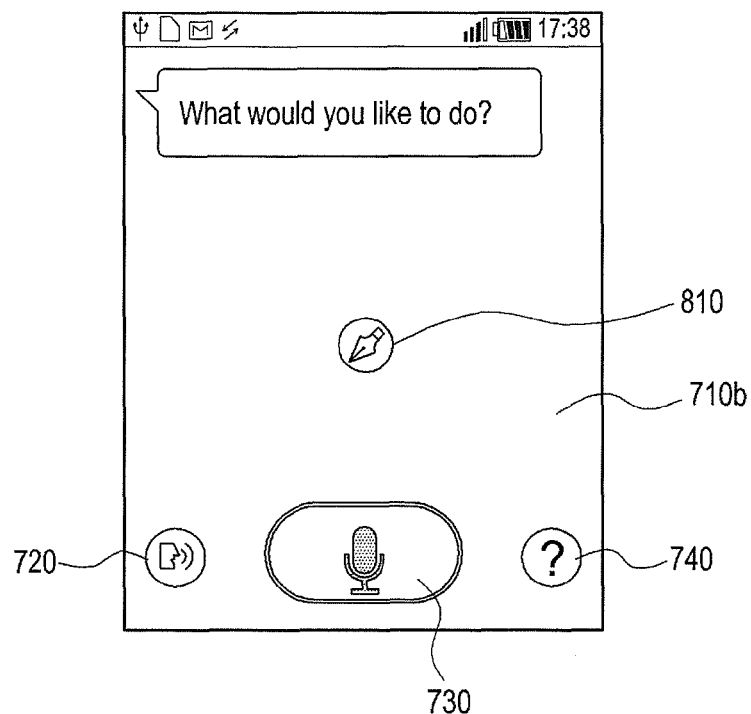
FIG. 8 illustrates a handwriting input button according to one embodiment of the present disclosure.

FIG. 8 is a diagram illustrating an example of the handwriting input button. When the hovering event remains for a preset time, a handwriting input button 810 having an indicator in a nib shape which indicates the handwriting input mode is displayed on an application window 710b.

In step S640, the device performs a switching into the handwriting input mode. The controller 110 switches the application execution mode to the handwriting input mode according to a mode switching request and then operates. In the handwriting input mode, the user inputs handwritten data having desired contents into the touch screen 190 by using the stylus pen 168. The handwriting input mode can be displayed through a tool bar including an indicator such as an icon or a text or a button for each function, or a separate handwriting input screen or window, and accordingly the user can view the handwriting input mode.

Figure 9:
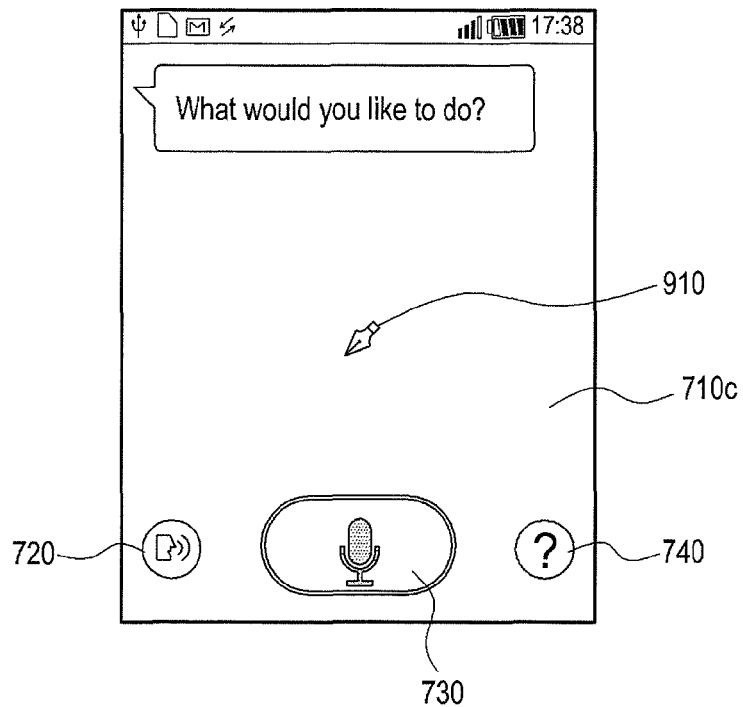
FIG. 9 illustrates a handwriting input mode display method according to one embodiment of the present disclosure.

FIG. 9 is a diagram illustrating an example of a handwriting input mode displaying method. According to the switching to the handwriting input mode, an indicator 910 in a nib shape which indicates the handwriting input mode is displayed on an application window 710c. The indicator 910 can be an image, a text, or a combination thereof.

Figure 10:
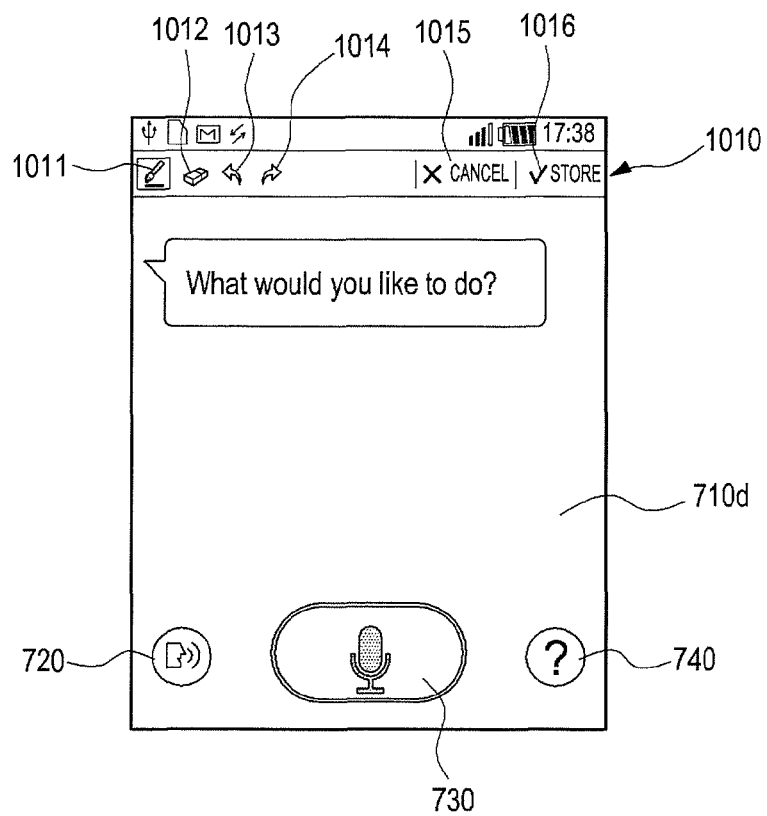
FIG. 10 illustrates a handwriting input mode display method according to another embodiment of the present disclosure.

FIG. 10 is a diagram illustrating another example of the handwriting input mode displaying method. According to the switching to the handwriting input mode, a handwriting input tool bar 1010 is displayed over or on an upper part of an application window 710d. The tool bar 1010 includes a first menu item 1011 for using a pen tool and setting a pen (setting a type, thickness, color and the like of the pen), a second menu item 1012 for using an eraser and setting a size of the eraser, a third menu item 1013 for canceling an execution, a fourth menu item 1014 for a re-execution, a fifth menu item 1015 for canceling the handwriting input mode, and a sixth menu item 1016 for storing the handwritten input data.

Figure 11:
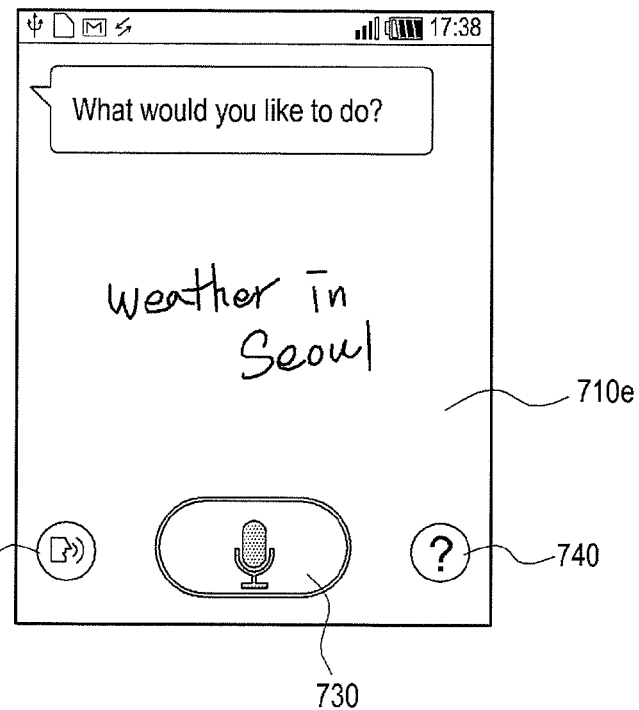
FIG. 11 illustrates handwriting input data according to one embodiment of the present disclosure.

FIG. 11 is a diagram illustrating an example of the handwritten input data. The user inputs desired contents into the touch screen 190 by using the stylus pen 168, that is, handwritten data 1110 having contents of "weather in Seoul" or "Seoul weather" in the present embodiment. In the present embodiment, since an application window 710e occupies most of the touch screen, the user inputs the handwritten data 1110 into the application window 710e.

In step S650, the device identifies a request for ending the handwriting input mode or switching to the application execution mode. The user can end the handwriting input mode by removing the stylus pen 168 over the detection threshold distance or more away from the touch screen 190 for a preset time. Unlike the present embodiment, the user can end the handwriting input mode by releasing the selection of the first menu item 1011 for using the pen tool and setting the pen which has been already selected as illustrated in FIG. 10.

In step S660, the device performs the switching to the application execution mode. When a state (i.e., touch up state) where the stylus pen 168 is removed over the detection threshold distance or more away from the touch screen 190 remains for a preset time, the controller 110 ends the handwriting input mode and performs the switching to the application execution mode.

In step S670, the device recognizes and converts the handwritten data. The controller 110 recognizes handwritten data 1110 input by the user and converts the handwritten data to text data having a preset format by performing an image-text conversion of the handwritten data 1110.

In step S680, the device processes the converted text data. The executed application performs a program operation according to the converted text data.

Figure 12:
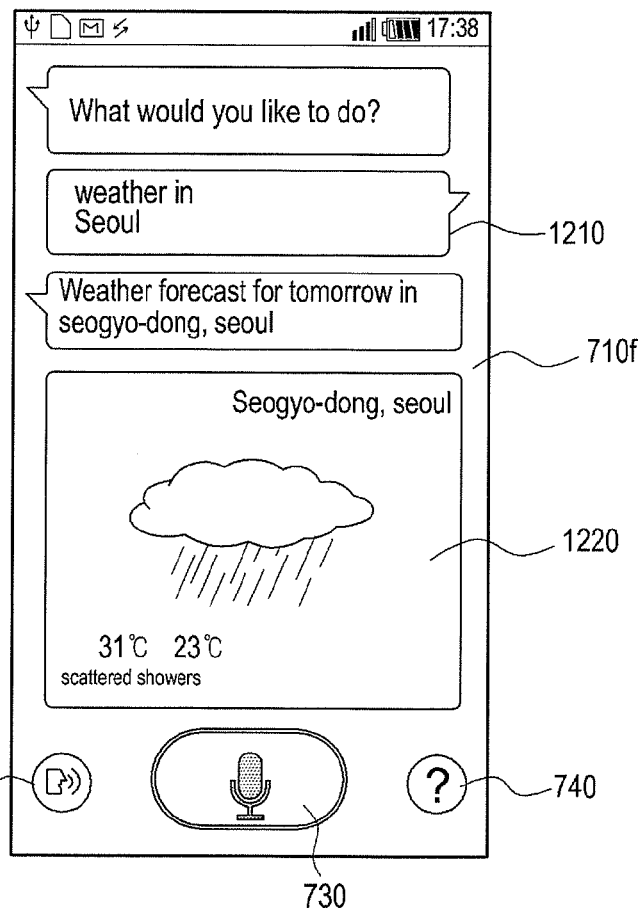
FIG. 12 illustrates a method of processing converted text data according to one embodiment of the present disclosure.

FIG. 12 is a diagram illustrating an example of a method of processing converted text data. The application displays converted text data 1210 on an application window 710f, searches for weather of Seoul by inputting the converted text data 1210 as a search word, and displays a search result 1220 on the application window 710f. At this time, the application can search for the weather of Seoul also by inputting the converted text data 1210 and a current position (e.g., Seogyo-dong) of the terminal 100.

The voice recognition application converts the converted text data 1210 to voice data again, transmits the converted voice data to a voice recognition server, and provides a response result received from the voice recognition server to the user.

As described above, a random application according to the present disclosure such as the voice recognition application or the like can transmit text data or voice data to the server and provide a response result received from the server to the user. When the server receives handwritten data or voice data from the portable terminal 100, the server can perform a writing-text conversion or a voice-text conversion.

For example, in one embodiment according to the present disclosure, an Internet application can access a server which requires a user authentication and then transmit handwritten data of the user to the server. The server identifies registered handwriting of the user and handwriting of the received handwritten data. Then, when the user authentication is successful, the server can provide a security access webpage such as an account inquiry webpage or an account transfer webpage to the user.

When the present disclosure is applied to such a security related environment, the present disclosure can be applied to an authentication system which requires an identification of handwriting of the user as well as a voice of the user. Furthermore, by providing both voice-text conversion information and writing-text conversion information to a security server, the security can be further enhanced.

Meanwhile, although it has been described that the switching to the handwriting input mode involves the hovering operation in the aforementioned example, the switching to the handwriting input mode can be performed only by clicking a handwriting input menu item or a button without performing the hovering operation.

For example, when the input button 810 shown in FIG. 8 or the tool bar 1010 shown in FIG. 10 is automatically fixedly displayed accompanied by the execution of the application or a preset touch pattern is input, the input button 810 or the tool bar 1010 can be provided through a menu (e.g., home screen or menu screen) provided by the application or an operating system.

Figure 13:
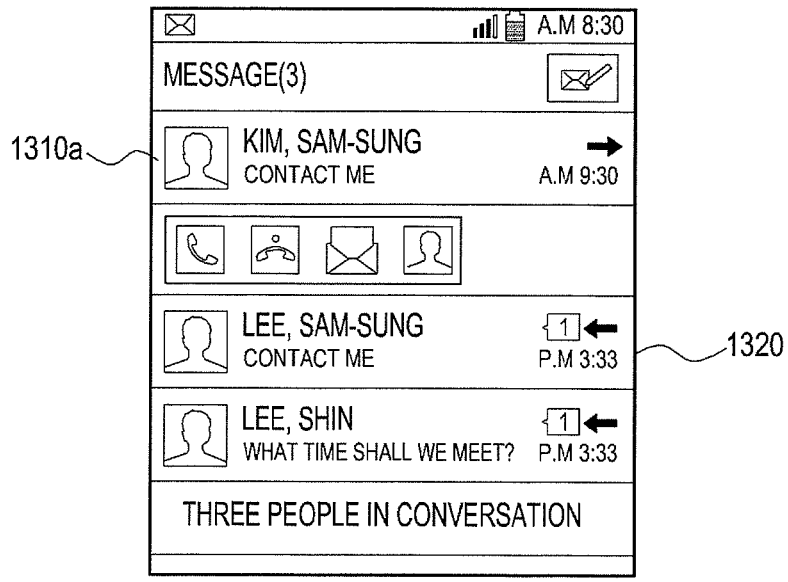
FIGS. 13 to 15 illustrate the user interface providing method in a message application according to another embodiment of the present disclosure.
Figure 14:
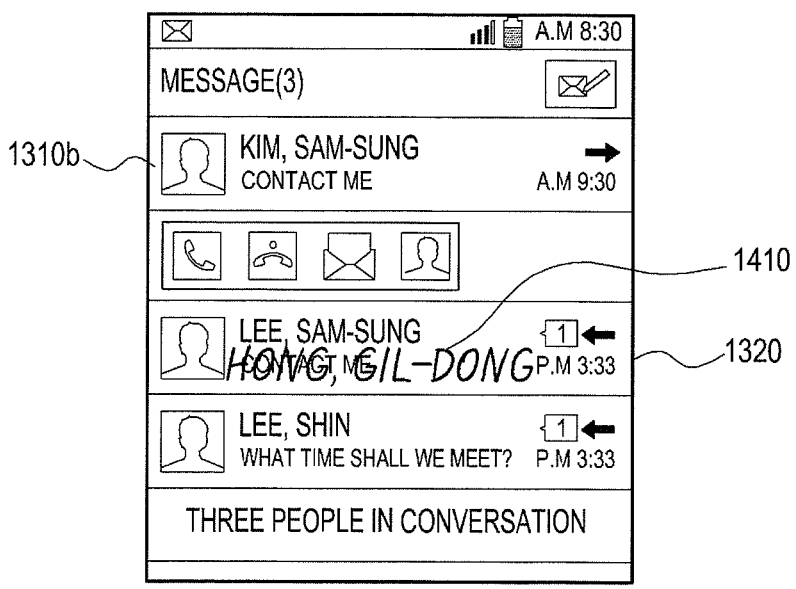
Figure 15:
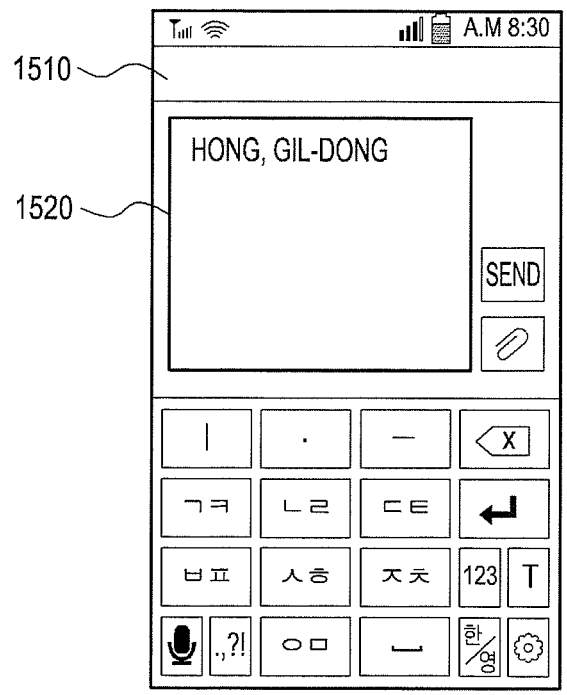

FIGS. 13 to 15 are diagrams for describing the user interface providing method in a message application according to another embodiment of the present disclosure.

FIG. 13 is a diagram illustrating a screen of a message application.

When the user inputs a preset hovering, pattern on a message 1320 received from "Lee, Sam-Sung" in an application window 1310a, the controller 110 switches an application execution mode to a handwriting input mode according to a mode switching request and then operates.

FIG. 14 is a diagram illustrating an example of handwriting input data. The user inputs desired contents, for example, handwriting data 1410 having contents of "Hong, Gil-Dong" on the touch screen 190 by using the stylus pen 168 in the present example. Since an application window 1310b occupies most of the touch screen 190, the user inputs the handwritten data 1410 into the application window 1310b. The controller recognizes the handwritten data 1410 input by the user and converts the handwritten data to text data having a preset format through an image-text conversion of the handwritten data 1410.

FIG. 15 is a diagram illustrating an example of a method of processing converted text data. The message application inserts and displays the converted text data in an input window 1520 within the application window 1510. The message application can automatically transmit the message into which the converted text data is inserted as a response message of the message received from "Lee, Sam-Sung".

Figure 16:
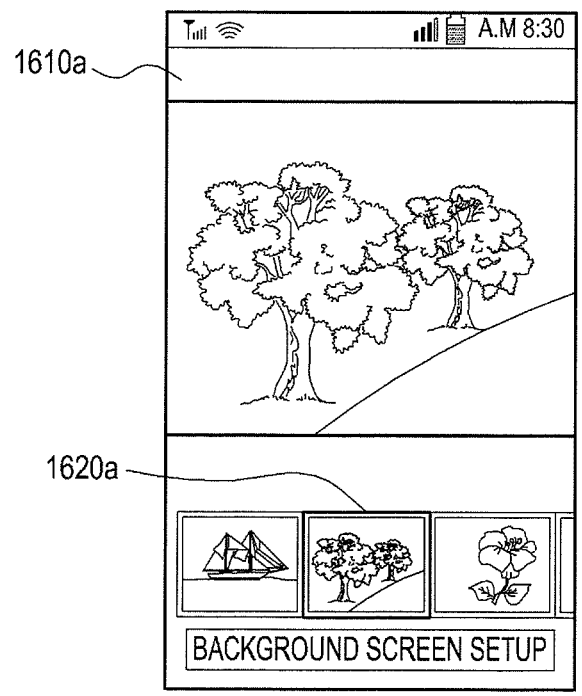
FIGS. 16 to 18 illustrate the user interface providing method in a gallery application according to still another embodiment of the present disclosure.
Figure 17:
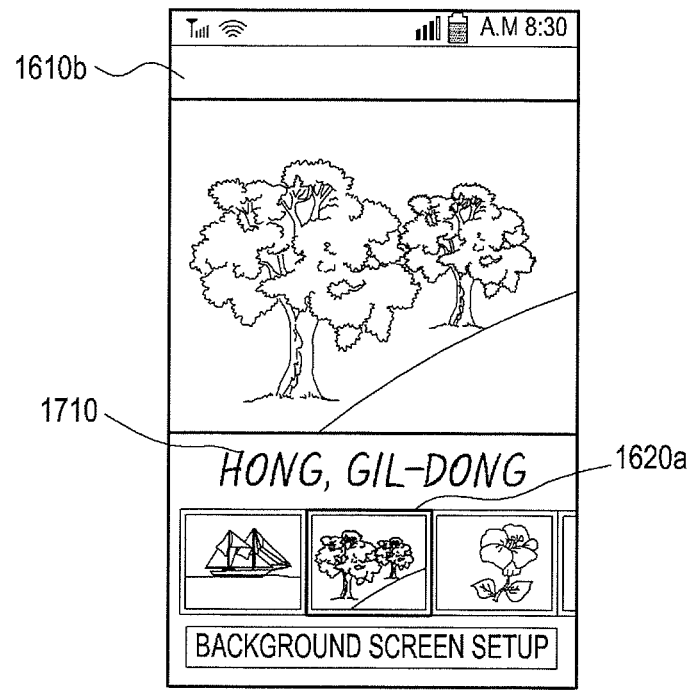
Figure 18:
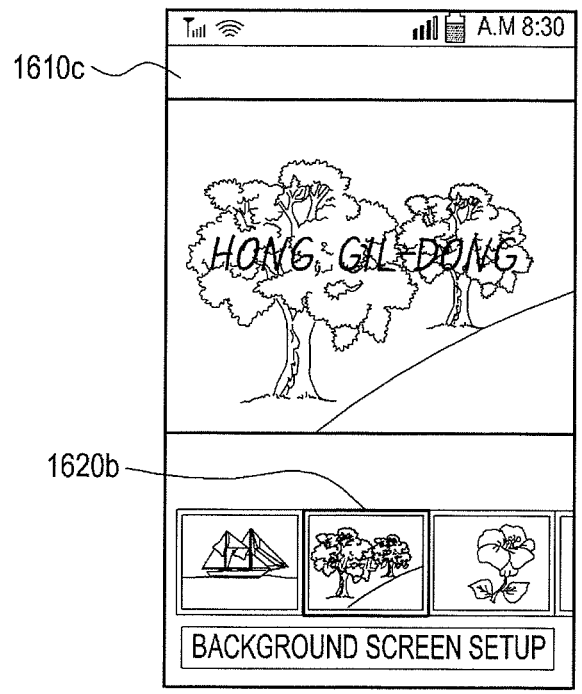

FIGS. 16 to 18 are diagrams for describing the user interface providing method in a gallery application according to still another embodiment of the present disclosure.

FIG. 16 is a diagram illustrating a screen of the gallery application.

When the user inputs a preset hovering pattern on a picture image 1620a selected within an application window 1610a, the controller 110 switches an application execution mode to a handwriting input mode according to a mode switching request and then operates.

FIG. 17 is a diagram illustrating an example of handwriting input data. The user inputs desired contents, for example handwritten data 1710 having contents of "To Hong, Gil-Dong" into the touch screen 190 in the present example. Since an application window 1610b occupies most of the touch screen 1610b in the present example, the user inputs the handwritten data 1710 into the application window 1610b. The controller 110 recognizes the handwritten data 1710 input by the user and converts the handwritten data to text data having a preset format through an image-text conversion of the handwritten data 1710.

FIG. 18 is a diagram illustrating an example of a method of processing converted text data. The gallery application stores converted text data which is overlaid with the original picture image 1620a and displays a stored picture image 1620b on an application window 1610c.

In the user interface providing method described through FIG. 6, a case where the handwritten data 1110 having the contents of "weather is Seoul" is simply input and the input handwritten data is processed has been described. The present disclosure can process an input of a combination of handwritten data and voice data.

Figure 19:
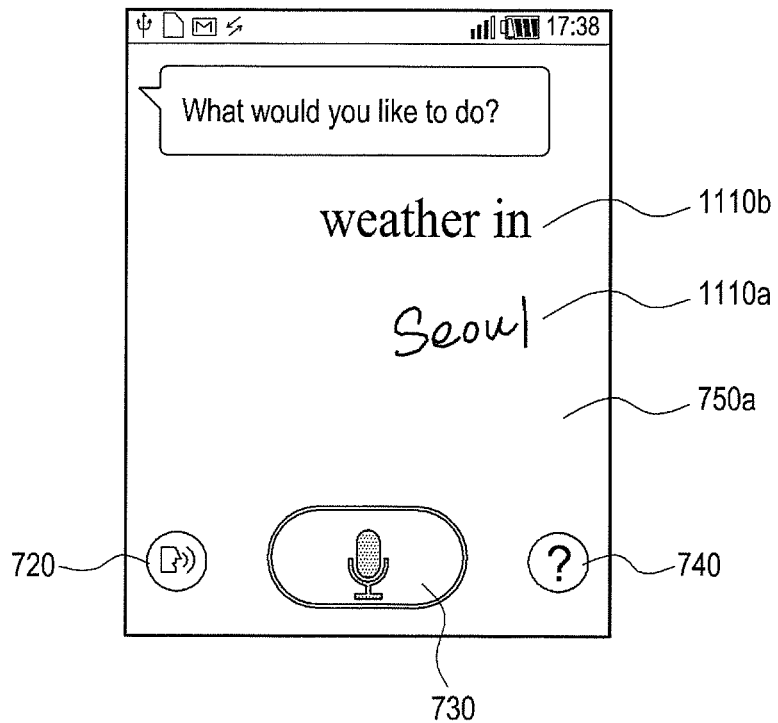
FIGS. 19 and 20 illustrate the user interface providing method in a voice recognition application according to a modified example of the present disclosure.
Figure 20:
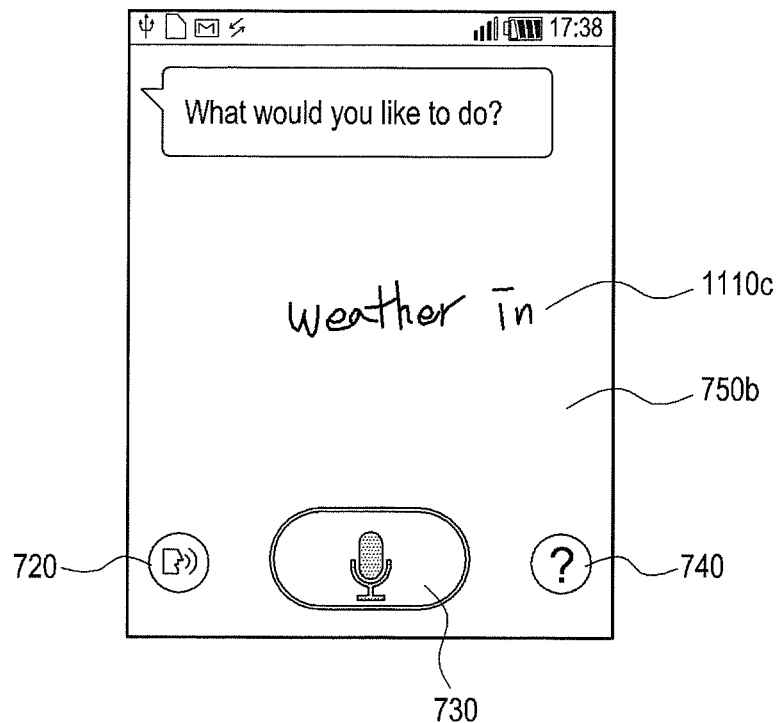

FIGS. 19 and 20 are diagrams for describing the user interface providing method in a voice recognition application according to a modified example of the present disclosure.

Referring to FIG. 19, the user inputs "weather in" with a voice in an application execution mode or a voice recognition mode and then inputs handwritten data 1110a having contents of "Seoul" into an application window 750a by using the stylus pen 168 in a handwriting input mode. Further, in order to allow the user to easily recognize the voice input contents, voice input contents 1110b can be converted to a text and then displayed on the application window 750a.

Referring to FIG. 20, the user inputs handwritten data 1110c having contents of "weather in" into an application window 750b by using the stylus pen 168 in the handwriting input mode and then inputs "Seoul" with a voice in the application execution mode or the voice recognition mode.

In order to input the combination of the handwritten data and the voice data, the controller 110 inputs the handwritten data or the voice data and identifies whether a preset threshold time exceeds. When the mode switching is completed within the threshold time, the controller 110 can standby for the input of the remaining data.

When receiving, the input of the combination of the handwritten data and the voice data, the controller 110 can transmit the voice data and the handwritten data to the server without any conversion, convert the voice data and the handwritten data to text data and then transmit the converted text data to the server, or convert the handwritten data to second voice data and then transmit the converted second voice data to the server together with the voice data. Further, the controller 110 can convert only one of the voice data and the handwritten data and not convert the other data, and then transmit a combination of the converted data and the non-converted data to the server.

For example as illustrated in FIG. 12, the voice recognition application can provide the response result received from the server to the user.

The present disclosure can input the handwriting by performing the switching to the handwriting input mode through only a hovering function of the pen without an additional component (H/W key or S/W button) while the user executes a function of the terminal. Further, according to the present disclosure, it is possible to transmit a text message and execute a search without passing through five steps of the conventional handwriting input by automatically converting stroke data input by the user to a text through a handwriting recognition, inserting the converted text into a text input window, and executing the inserted text.

It can be appreciated that the embodiments of the present disclosure can be implemented in software, hardware, or a combination thereof. Any such software can be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure. Therefore, embodiments of the present disclosure provide a program including codes for implementing a system or method claimed in any claim of the accompanying claims and a machine-readable device for storing such a program. Further, this program can be electronically conveyed through any medium such as a communication signal transferred via a wired or wireless connection, and embodiments of the present disclosure appropriately include equivalents thereto.

Further, the portable terminal can receive the program from a program providing apparatus connected to the portable terminal wirelessly or through a wire and store the received program. The program providing apparatus can include a memory for storing a program containing instructions for allowing the portable terminal to perform a preset content protecting method and information required for the content protecting method, a communication unit for performing wired or wireless communication with the portable terminal, and a controller for transmitting the corresponding program to the portable terminal according to a request of the portable terminal or automatically.

Although the present disclosure has been described with the embodiments, various changes and modifications may be suggested to one skilled in the art. It is intended that the present disclosure encompass such changes and modifications as fall within the scope of the appended claims.

What is claimed is:

1. A method for providing a user interface of a portable terminal, the method comprising:
   executing a voice recognition application;
   in response to receiving a request for activating a handwriting input mode while executing the voice recognition application, activating the handwriting input mode;
   recognizing handwritten data received from a user via a touch screen of the voice recognition application;
   transmitting, by the voice recognition application, the handwritten data in a preset format as a search word to a server;
   receiving, by the voice recognition application, a search result in response to the search word from the server; and
   causing the touch screen to display the search result.

2. The method of claim 1, wherein the request is one of an input of a hovering pattern using a touch means, an input of a touch pattern using the touch means, a click of a handwriting input button, and a click of a handwriting input menu item.

3. The method of claim 2, wherein the hovering pattern is performed by maintaining a position of the touch means within a detection threshold distance from a surface of the touch screen for a preset time.

4. The method of claim 1, wherein the handwritten data is displayed on an application window.

5. The method of claim 1, wherein the handwritten data is converted to text data.

6. The method of claim 1, wherein the handwritten data with the preset format and additional data input by the user are transmitted to the server.

7. The method of claim 1, wherein the handwritten data is converted to voice data, and the voice data is transmitted to a voice recognition server.

8. The method of claim 1, wherein the handwritten data is converted to first voice data, the first voice data and second voice data input by the user are transmitted to a voice recognition server.

9. A non-transitory machine-readable storage medium embodied with program instructions for causing a processor to execute a method in a device, the method comprising:
   executing a voice recognition application;
   in response to receiving a request for activating a handwriting input mode while executing the voice recognition application, activating the handwriting input mode;
   recognizing handwritten data received from a user via a touch screen of the voice recognition application;
   transmitting, by the voice recognition application, the handwritten data in a preset format as a search word to a server;
   receiving a search result in response to the search word from the server by the voice recognition application; and
   causing the touch screen to display the search result.

10. A device comprising a non-transitory machine-readable storage medium embodied with program instructions for causing a processor to execute a method, the method comprising:
    executing a voice recognition application;
    in response to receiving a request for activating a handwriting input mode while executing the voice recognition application, activating the handwriting input mode;
    recognizing handwritten data received from a user via a touch screen of the voice recognition application;
    transmitting, by the voice recognition application, the handwritten data in a preset format as a search word to a server;
    receiving a search result in response to the search word from the server by the voice recognition application; and
    causing the touch screen to display the search result.

11. A portable terminal for providing a user interface, the portable terminal comprising:
    a storage unit configured to store a voice recognition application;
    a touch screen configured to display input data and detect contact or hovering of a touch means; and
    a controller configured to:
       execute the voice recognition application;
       in response to receiving a request for activating a handwriting input mode while executing the voice recognition application, activate the handwriting input mode;
       recognize handwritten data received from a user via a touch screen of the voice recognition application;
       transmit, by the voice recognition application, the handwritten data in a preset format as a search word to a server;
       receive a search result in response to the search word from the server by the voice recognition application; and
       cause the touch screen to display the search result.

12. The portable terminal of claim 11, wherein the request is one of an input of a hovering pattern using a touch means, an input of a touch pattern using the touch means, a click of a handwriting input button, and a click of a handwriting input menu item.

13. The portable terminal of claim 12, wherein the hovering pattern is performed by maintaining a position of the touch means within a detection threshold distance from a surface of the touch screen for a preset time.

14. The portable terminal of claim 11, wherein the handwritten data is displayed on an application window.

15. The portable terminal of claim 11, wherein the handwritten data is converted to text data.

16. The portable terminal of claim 11, wherein the handwritten data is converted to voice data, and the voice data is transmitted to a voice recognition server.

17. The portable terminal of claim 11, wherein the handwritten data in the preset format and additional data input by the user are transmitted to the server.

* * * * *